United States Patent
Madsen

(10) Patent No.: US 9,403,335 B2
(45) Date of Patent: Aug. 2, 2016

(54) WIND TURBINE ROTOR BLADE WITH TRAILING EDGE COMPRISING ROVINGS

(71) Applicant: Kristian Lehmann Madsen, Fredericia (DK)

(72) Inventor: Kristian Lehmann Madsen, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 633 days.

(21) Appl. No.: 13/741,492

(22) Filed: Jan. 15, 2013

(65) Prior Publication Data

US 2013/0189113 A1 Jul. 25, 2013

(30) Foreign Application Priority Data

Jan. 20, 2012 (EP) .................................... 12151903

(51) Int. Cl.

| | |
|---|---|
| *F03B 3/12* | (2006.01) |
| *B29D 99/00* | (2010.01) |
| *B29C 70/34* | (2006.01) |
| *B29C 70/88* | (2006.01) |
| *F01D 5/14* | (2006.01) |
| *B29L 31/08* | (2006.01) |

(52) U.S. Cl.
CPC .......... *B29D 99/0025* (2013.01); *B29C 70/342* (2013.01); *B29C 70/887* (2013.01); *B29D 99/0028* (2013.01); *F01D 5/14* (2013.01); *B29L 2031/085* (2013.01); *Y02E 10/721* (2013.01); *Y02P 70/523* (2015.11)

(58) Field of Classification Search
CPC ..... F03D 1/0633; F03D 1/0675; F03D 1/061; F03D 1/062; F03D 1/06; F05B 2280/6003; B29C 70/34; B29C 70/88
USPC ...................................... 416/224, 230, 241 A
See application file for complete search history.

(56) References Cited

U.S. PATENT DOCUMENTS

| | | | | |
|---|---|---|---|---|
| 3,219,123 | A * | 11/1965 | Stocker | 416/230 |
| 3,476,625 | A * | 11/1969 | Slivinsky et al. | 156/86 |
| 3,950,115 | A * | 4/1976 | Euler | 416/226 |
| 2003/0116262 | A1* | 6/2003 | Stiesdal et al. | 156/245 |
| 2004/0150130 | A1 | 8/2004 | Bennett | |

FOREIGN PATENT DOCUMENTS

| | | | |
|---|---|---|---|
| CN | 101992553 A | 3/2011 | |
| CN | 102086297 A | 6/2011 | |
| EP | 1310351 B1 | 4/2006 | |
| JP | 8165363 A | 6/1996 | |
| WO | WO 2012130339 | * 6/2011 | ............... F03D 1/06 |

* cited by examiner

*Primary Examiner* — Dwayne J White
*Assistant Examiner* — Jason Mikus

(57) ABSTRACT

A method for manufacturing a wind turbine rotor blade having a trailing edge by Vacuum Assisted Resin Transfer Molding is described. A number of layers having fiber material are laid up onto the inner surface of a first mold part. A plurality of fiber rovings is laid up onto the number of layers at a position which forms the trailing edge of the blade. The blade is cast using Vacuum Assisted Resin Transfer Molding.

11 Claims, 4 Drawing Sheets

WIND TURBINE ROTOR BLADE WITH TRAILING EDGE COMPRISING ROVINGS

CROSS REFERENCE TO RELATED APPLICATIONS

This application claims priority of European Patent Office application No. 12151903.7 EP filed Jan. 20, 2012, which is incorporated by reference herein in its entirety.

FIELD OF INVENTION

The present application relates to a method for manufacturing a wind turbine rotor blade comprising a trailing edge by Vacuum Assisted Resin Transfer Moulding (VARTM). It further relates to a wind turbine rotor blade and to a wind turbine.

BACKGROUND OF INVENTION

From the document EP 1 310 351 B1 it is known to cast an integrated wind turbine rotor blade in one moulding process using for example a VARTM process. It is furthermore known to add core material such as balsawood or PVC foam in the blade, such as at the trailing edge of the blade, to increase the stability and stiffness of the blade. The purpose of putting core material in the trailing edge of the blade is to build stiffness to this part of the rotor blade.

To integrate for example triangular shaped trailing edge core material it is necessary to establish extra layers of reinforced material around the triangular shaped trailing edge core material and it all is established in between the outer shell layers of the blade composite structure. Hereby a trailing edge "web" is created which helps in transferring forces and creates stiffness between the upper and lower parts of the blade construction. However, one difficulty with this solution is that it is relatively time consuming to lay up the reinforced fibre material around the core material in a proper manner so that the desired construction and properties are achieved.

SUMMARY OF INVENTION

A first objective of the present application is to provide an improved method for manufacturing a wind turbine rotor blade which is less time consuming and saves costs. It is a second objective of the present application to provide a wind turbine rotor blade. A third objective is to provide a wind turbine.

The disclosed method for manufacturing a wind turbine rotor blade comprising a trailing edge is performed by Vacuum Assisted Resin Transfer Moulding (VARTM). The disclosed method comprises the steps of laying up a number of layers comprising fibre material onto the inner surface of a first mould part, laying up a plurality of fibre rovings onto the number of layers at a position which forms the trailing edge of the blade, and casting the blade using Vacuum Assisted Resin Transfer Moulding. The plurality of fibre rovings can be laid up onto the innermost or inner or uppermost layer of the previously laid up number of fibre layers.

The application is in that the construction uses lesser and cheaper material and thus is lighter than the construction of prior art though still providing the transfer of forces between upper and lower part of the blade. Moreover, reinforcement of the trailing edge is achieved, in combination with shear force transfer between the two blade sides.

The application is further in that the construction is relatively simple to build up during the manufacturing of the blade i.e. during lay-up of fibre material. The effect of this is that it is cost effective as less man-hour is spent.

The application is even further in that bundles of rovings are very flexible and will absorb process tolerances between the blade sides at the trailing edge and consequently adapt its form to the cavity which the mould form creates.

The used rovings may have a longitudinal direction. The rovings can be laid up with the longitudinal direction running parallel to the trailing edge or parallel to the blade longitudinal direction or span direction.

Bundles of roving can be used in order to be able to control the lay-up of the fibre rovings in the mould before casting and for holding the fibre rovings. A number of rovings may be bundled or joined or connected or combined to a bundle before laying up the number of rovings onto the number of layers.

For example, a wrapping or wrapping coating or sock or a similar means with a similar function can be used to form the bundle of rovings. The wrapping or wrapping coating or sock or the similar means can comprise fibre material, for example glass fibre material or carbon fibre material, and/or paper and/or plastics and/or a polymer. Moreover, the wrapping or wrapping coating or sock or similar means can at least partly dissolve during the casting process. This has the feature that the rovings can perfectly adapt to the shape given by the mould parts during the casting process.

The plurality of rovings can be established in parallel inside the said wrapping or wrapping coating or sock or similar means.

A second mould part comprising an inner surface, onto which a number of layers comprising fibre material is laid up, can be placed onto the first mould part creating a closed mould cavity. Moreover, an airtight membrane can be placed onto the fibre rovings and the number of layers, such as the innermost fibre layer, for creating vacuum in the space between the membrane and the inner surface of the first mould part and/or the inner surface of the second mould part. Creating vacuum is necessary for performing the VARTM process.

Furthermore, the fibre rovings can be compressed and/or adapted to a shape defined by the first mould part and/or second mould part and/or the airtight membrane, for example by applying vacuum.

The disclosed wind turbine rotor blade comprises a trailing edge and an inner surface. The inner surface of the blade at the trailing edge comprised a plurality of fibre rovings. The disclosed wind turbine rotor blade can be manufactured by the previously described method.

The disclosed wind turbine comprises a wind turbine rotor blade as previously described.

The present application has the feature, that lesser and cheaper material can be used compared with the state of the art and thus a lighter construction is obtained. Furthermore, an improved transfer of forces between upper and lower part of the blade, i.e. between pressure side and suction side, and also an additional reinforcement of the trailing edge are provided. Furthermore, the construction is relatively simple and cost effective as less man-hour is spent.

BRIEF DESCRIPTION OF THE DRAWINGS

Features of the present application will become clear from the following description of an embodiment in conjunction with the accompanying drawings. The embodiment does not limit the scope of the present application which is determined by the appended claims. All described features are as separate features or in any combination with each other.

DETAILED DESCRIPTION OF INVENTION

Figure 1:
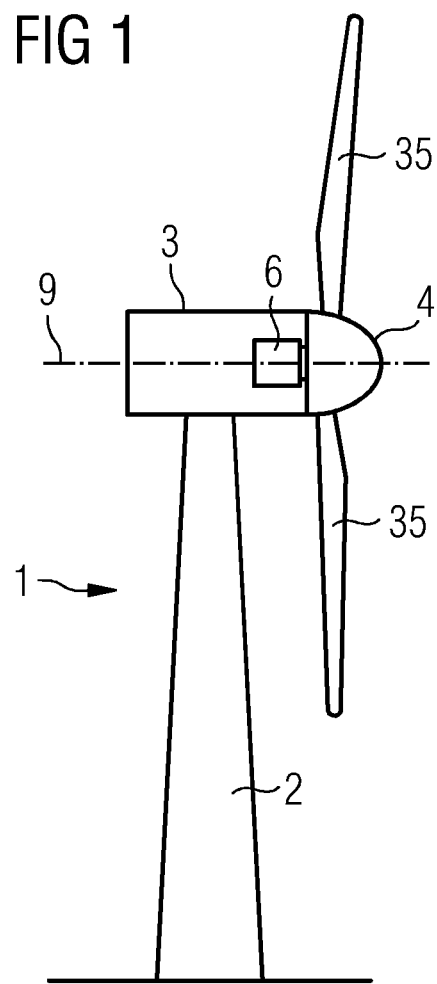
FIG. 1 schematically shows a wind turbine.

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 35. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

Figure 2:
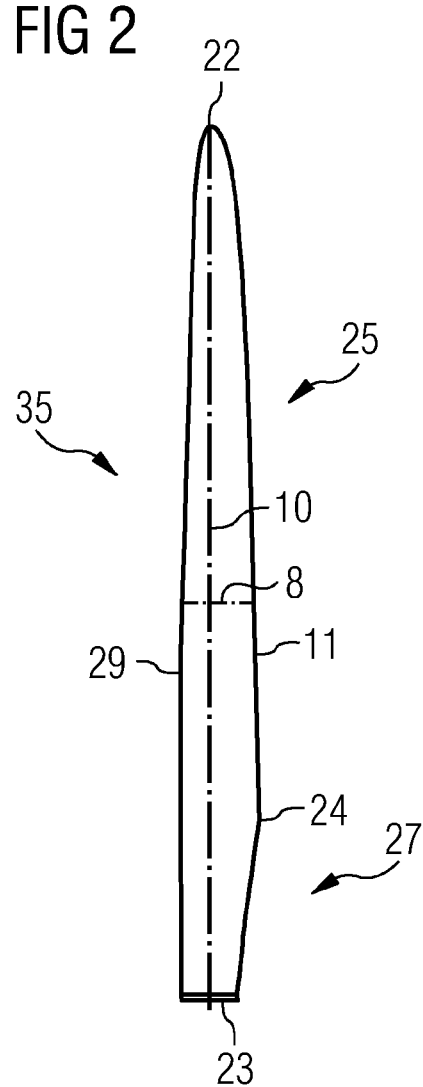
FIG. 2 schematically shows a rotor blade in a plan view on the plane defined by the blade's span and the blade's chord.

FIG. 2 shows a rotor blade in a plan view on the plane defined by the blade's span 10 and the blade's chord 8. FIG. 2 shows a wind turbine blade 35 as it is usually used in a three-blade rotor. However, the present application shall not be limited to blades for three-blade rotors. In fact, it may as well be implemented in other rotors, e.g. one-blade rotors or two-blade rotors.

The rotor blade 35 shown in FIG. 1 comprises a root portion 23 with a cylindrical profile and a tip 22. The tip 22 forms the outermost part of the blade 35. The cylindrical profile of the root portion 23 serves to fix the blade 35 to a bearing of a rotor hub 4. The rotor blade 35 further comprises a so-called shoulder 24 which is defined as the location of its maximum profile depth, i.e. the maximum chord length of the blade. Between the shoulder 24 and the tip 22 an airfoil portion 25 extends which has an aerodynamically shaped profile. Between the shoulder 24 and the cylindrical root portion 23, a transition portion 27 extends in which a transition takes place from the aerodynamic profile of the airfoil portion 25 to the cylindrical profile of the root portion 23.

A chord-wise cross section through the rotor blade's airfoil section 25 is shown in FIG. 2. Their aerodynamic profile shown in FIG. 2 comprises a convex suction side 13 and a less convex pressure side 15. The dash-dotted line extending from the blade's leading edge 29 to its trailing edge 11 shows the chord of the profile. Although the pressure side 15 comprises a convex section 17 and a concave section 19 in FIG. 2, it may also be implemented without a concave section at all as long as the suction side 13 is more convex than the pressure side 15.

The suction side 13 and the pressure side 15 in the airfoil portion 25 will also be referred to as the suction side and the pressure side of the rotor blade 35, respectively, although, strictly spoken, the cylindrical portion 23 of the blade 35 does not show a pressure or a suction side.

Figure 4:
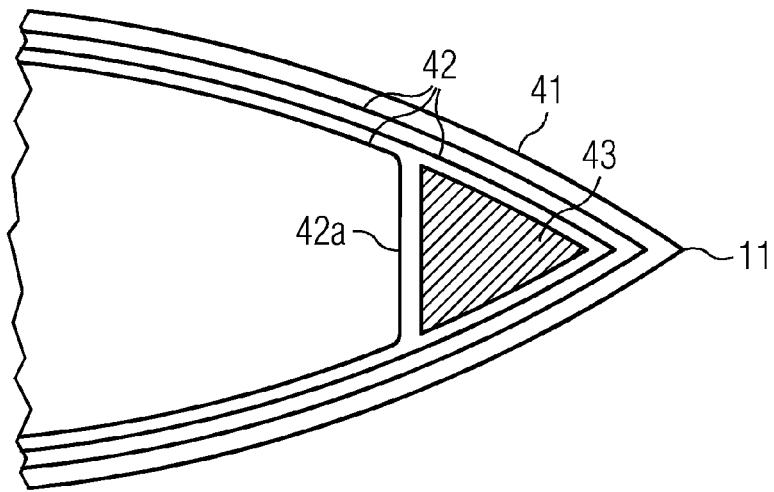
FIG. 4 schematically shows the process of putting core material in the trailing edge of the blade.

FIG. 4 schematically shows the process of putting core material in the trailing edge of the blade to build stiffness to this part of the rotor blade as it is known from for example EP 1 310 351 B 1. Extra layers of reinforced material 42 and 42a are established around a triangular shaped trailing edge core material 43 and it all is established in between outer shell layers 41 of the blade composite structure. Hereby, a trailing edge web 42a is created which helps in transferring forces and creates stiffness between the upper and lower parts of the blade construction.

Figure 3:
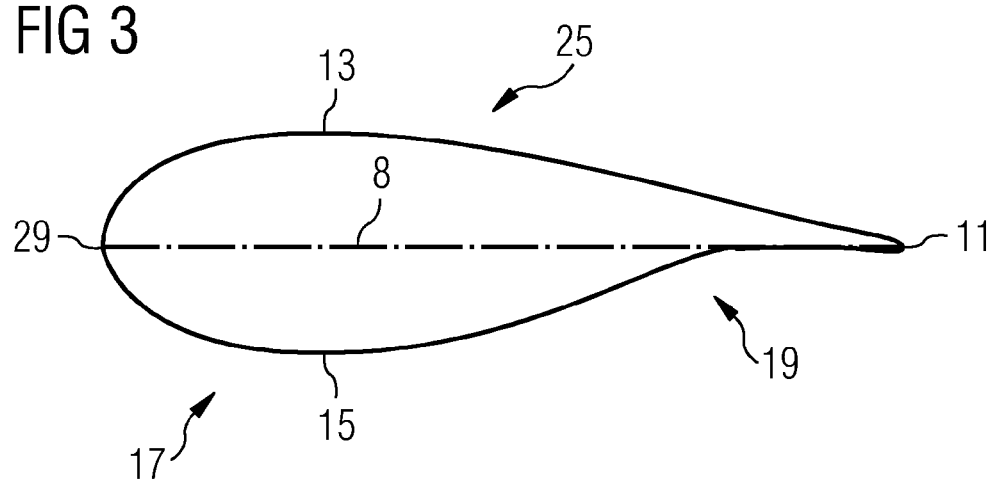
FIG. 3 schematically shows a chord wise section through the airfoil portion of the blade shown in FIG. 2.

An embodiment of the present application will now be described with reference to FIGS. 5 to 8 in conjunction with FIGS. 1 to 3. In the context of the present application the trailing edge core material 43 as well as the said extra mats or layers of reinforced material 42, 42a in the trailing edge 11 are replaced with a plurality of composite fibre rovings extending along the trailing edge 11.

Figure 5:
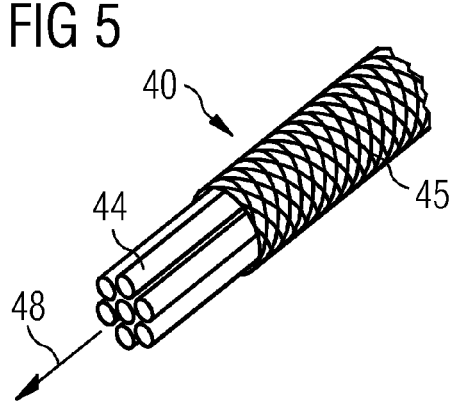
FIG. 5 schematically shows a bundle rovings in a perspective view.

In order to be able to control the lay-up of the fibre rovings 44 in the mould before casting, it may be necessary to hold the fibre rovings 44, for example in a glass or carbon fibre sock or wrapping coating 45. This is schematically illustrated in FIG. 5. FIG. 5 schematically shows a bundle rovings 40 in a perspective view. A number of rovings 44 are combined to a bundle by a sock or wrapping coating 45. The rovings 44 comprise a longitudinal direction 48 and are arranged parallel to each other and parallel to the longitudinal direction 48. The wrapping coating 45 comprises reinforcement material, for example glass fibre or carbon fibre material, and/or paper and/or plastics and/or a polymer. The sock or wrapping coating 45 at least partly dissolves during the casting process.

Figure 6:
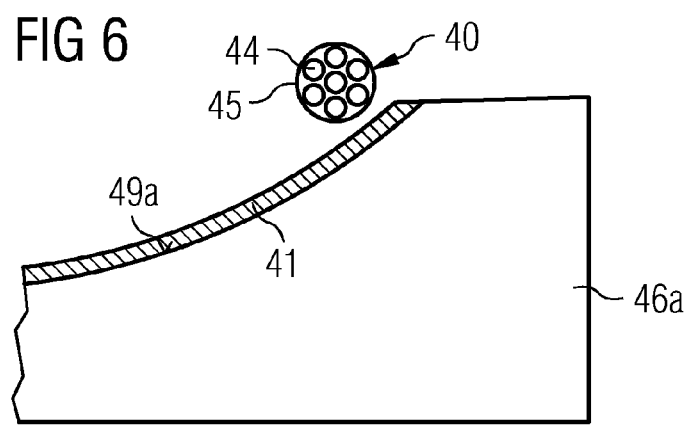
FIG. 6 schematically shows a first mould part in a sectional view.

FIG. 6 schematically shows a first mould part 46a in a sectional view showing a position which forms the trailing edge 11 of the blade 35. The first mould part 46a comprises an inner surface 49a. A number of layers 41 comprising fibre material are laid up onto the inner surface 49a of the first mould part 46a.

The bundle of rovings 40 is laid up onto the number of layers 41, more precisely onto the innermost or uppermost layer of the number of layers, at a position which forms the trailing edge 11 of the blade 45.

Figure 7:
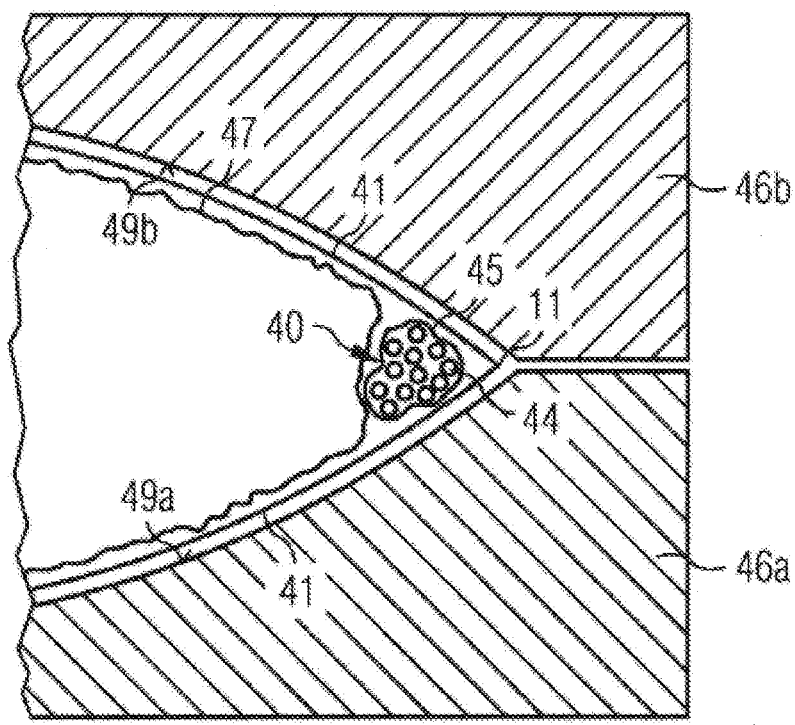
FIG. 7 schematically shows the first mould part and a second mould part forming a closed mould cavity in a sectional view.

FIG. 7 schematically shows the first mould part 46a and a second mould part 46b forming a closed mould cavity in a sectional view. The second mould part 46b also comprises an inner surface 49b onto which a number of layers comprising fibre material 41 are laid up as previously described in conjunction with FIG. 6 and the first mould part 46a. The second mould part 46b is placed onto the first mould part 46a forming a closed mould cavity. An airtight membrane 47 is placed onto the inner side of the construction, which means onto the number of layers 41 and onto the bundle of rovings 40, so that it is possible to create a vacuum in the space between the membrane 47 and the inner surfaces 49a and 49b of the mould parts 46a and 46b as required for the VARTM process. In other words, the bundle of rovings 40 or sock 45 comprising the plurality of fibre rovings 44 is laid up and also placed in the "vacuum space".

When applying vacuum the sock or wrapping coating 45 and the rovings 44 will be compressed and adapted to the shape defined by the mould forms 46a and 46b and the vacuum bag 47. Then the blade is casted using VARTM. During this process resin is injected into the space between the inner surfaces 49a and 49b of the mould parts 46a and 46b and the airtight membrane 47. In a variant of the application, the wrapping coating or sock 45 enclosing the said rovings 44 dissolves during the casting process.

Figure 8:
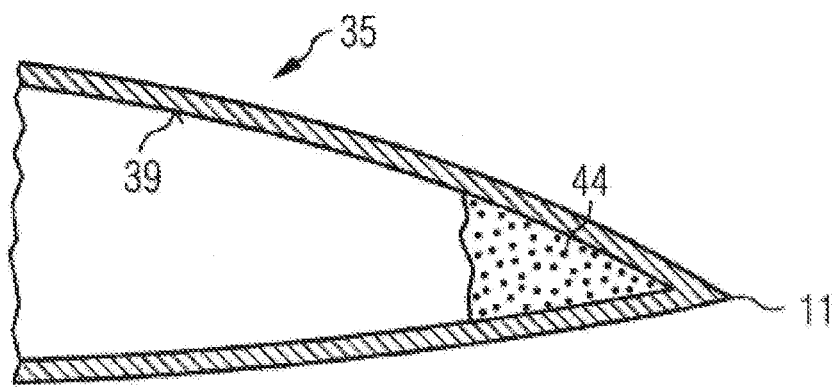
FIG. 8 schematically shows part of the manufactured wind turbine blade in a sectional view.

Then the resin is set. Consequently, after ending the moulding process and after removing the airtight membrane 47 the casted blade trailing edge 11 schematically looks like illustrated in FIG. 8. FIG. 8 schematically shows part of the manufactured wind turbine blade, more precisely part of the wind turbine rotor blade close to the trailing edge 11, in a sectional view. The manufactured wind turbine rotor blade 35 comprises an inner surface 39. The inner surface 39 close to the trailing edge 11 comprises a plurality of fibre rovings 44.

The invention claimed is:

1. A method for manufacturing a wind turbine rotor blade comprising a trailing edge by Vacuum Assisted Resin Transfer Moulding, comprising:
    laying up a plurality of layers comprising fibre material onto an inner surface of a first mould part;
    laying up a plurality of fibre rovings onto the plurality of layers at a position of the trailing edge;
    placing an airtight membrane onto the plurality of fibre rovings and the plurality of layers comprising fibre material and
    casting the wind turbine rotor blade using the Vacuum Assisted Resin Transfer Moulding.

2. The method as claimed in claim 1, wherein the rovings comprise a longitudinal direction and are laid up with the longitudinal direction running parallel to the trailing edge.

3. The method as claimed in claim 1, wherein the rovings are bundled, joined, connected, or combined to form a bundle before laying up onto the plurality of layers.

4. The method as claimed in claim 3, wherein the bundle is formed by a wrapping, a wrapping coating, or a sock.

5. The method as claimed in claim 4, wherein the wrapping, the wrapping coating, or the sock comprises fibre material, paper, plastics, or polymer.

6. The method as claimed in claim 4, wherein the wrapping, the wrapping coating, or the sock is at least partly dissolved during the casting.

7. The method as claimed in claim 1, wherein the plurality of layers is laid up onto an inner surface of a second mould part, and wherein the second mould part is placed onto the first mould part creating a closed mould cavity.

8. The method as claimed in claim 7, wherein the rovings are compressed or adapted to a shape defined by the first and/or the second mould part and/or the airtight membrane.

9. The method as claimed in claim 1, wherein the shape is formed by applying vacuum.

10. A wind turbine rotor blade, comprising:
    a trailing edge;
    an inner surface; and
    a plurality of fibre rovings laid up at the inner surface of the trailing edge,
    wherein the wind turbine rotor blade is manufactured according to claim 1.

11. A wind turbine, comprising:
    a wind turbine rotor blade as claimed in claim 10.

* * * * *